United States Patent
Won et al.

(10) Patent No.: US 12,084,553 B2
(45) Date of Patent: Sep. 10, 2024

(54) POLYIMIDE FILM COMPRISING AT LEAST TWO FILLERS HAVING DIFFERENT DIAMETERS, AND ELECTRONIC DEVICE COMPRISING SAME

(71) Applicant: PI Advanced Materials Co., Ltd., Iwol (KR)

(72) Inventors: Dong Young Won, Iwol (KR); Dong Young Kim, Iwol (KR); Jeong Yeul Choi, Iwol (KR)

(73) Assignee: PI Advanced Materials Co., Ltd., Iwol (KR)

( * ) Notice: Subject to any disclaimer, the term of this patent is extended or adjusted under 35 U.S.C. 154(b) by 580 days.

(21) Appl. No.: 17/298,484

(22) PCT Filed: Mar. 26, 2019

(86) PCT No.: PCT/KR2019/003492
§ 371 (c)(1),
(2) Date: May 28, 2021

(87) PCT Pub. No.: WO2020/111400
PCT Pub. Date: Jun. 4, 2020

(65) Prior Publication Data
US 2022/0017711 A1    Jan. 20, 2022

(30) Foreign Application Priority Data
Nov. 30, 2018  (KR) .................. 10-2018-0152037

(51) Int. Cl.
*C08J 5/18*     (2006.01)
*C08G 73/10*    (2006.01)
*C08K 7/18*     (2006.01)

(52) U.S. Cl.
CPC ............. *C08J 5/18* (2013.01); *C08G 73/1032* (2013.01); *C08G 73/105* (2013.01);
(Continued)

(58) Field of Classification Search
CPC ..... C08J 5/18; C08J 2379/08; C08G 73/1032; C08G 73/105; C08G 73/1071; C08K 7/18; C08K 2201/005; C08K 3/36
See application file for complete search history.

(56) References Cited

U.S. PATENT DOCUMENTS

2016/0291729 A1\* 10/2016 Schardt .................. H10N 30/01
2016/0355685 A1\* 12/2016 Ono ........................ C08K 9/06
(Continued)

FOREIGN PATENT DOCUMENTS

JP       3953051 B2       5/2007
KR       1156084 B1 \*    6/2012    ......... C08G 73/1021
(Continued)

OTHER PUBLICATIONS

Espacenet Translation of KR-1156084-B1 (Year: 2024).\*
(Continued)

*Primary Examiner* — Michael Zhang
(74) *Attorney, Agent, or Firm* — Dorsey & Whitney LLP

(57) ABSTRACT

The present invention provides a polyimide film comprising an inorganic filler, which comprises a first filler group having a diameter (D50) of 2-2.7 μm and a second filler group having an average diameter (D50) of 1-1.7 μm, wherein the polyimide film satisfies relation 1: $0.7 \leq (D90-D10)/(D50) \leq 1.2$, which is about the respective diameters of the first filler group and the second filler group.

14 Claims, 2 Drawing Sheets

(52) U.S. Cl.
CPC ............ *C08G 73/1071* (2013.01); *C08K 7/18* (2013.01); *C08J 2379/08* (2013.01); *C08K 2201/005* (2013.01)

(56) References Cited

U.S. PATENT DOCUMENTS

| | | | |
|---|---|---|---|
| 2019/0031844 A1* | 1/2019 | Kato | H01B 3/306 |
| 2019/0181330 A1* | 6/2019 | Tanabe | C01G 33/006 |
| 2022/0017710 A1* | 1/2022 | Won | C08G 73/1042 |

FOREIGN PATENT DOCUMENTS

| | | |
|---|---|---|
| KR | 101156084 B1 | 6/2012 |
| KR | 20160077694 A | 7/2016 |
| KR | 20160108252 A | 9/2016 |
| KR | 20170112475 A | 10/2017 |

OTHER PUBLICATIONS

International Search Report and Written Opinion received in PCT Application No. PCT/KR2019/003492 dated Aug. 26, 2019 (Engl. Translation of ISR only).

* cited by examiner

POLYIMIDE FILM COMPRISING AT LEAST TWO FILLERS HAVING DIFFERENT DIAMETERS, AND ELECTRONIC DEVICE COMPRISING SAME

RELATED APPLICATIONS

This application is a U.S. National Stage filing under 35 U.S.C. § 371 of PCT Application No. PCT/KR2019/003492, filed Mar. 26, 2019, which claims priority to Korean Application No. 10-2018-0152037 filed Nov. 30, 2018, which applications are incorporated herein by reference in their entirety, for any purpose.

TECHNICAL FIELD

The present disclosure relates to a polyimide film including two or more fillers having different particle diameters, and an electronic device including the same.

BACKGROUND ART

Polyimide (PI) is a polymer material that is based on a rigid aromatic backbone and an imide ring with very excellent chemical stability to have the highest level of heat resistance, chemical resistance, electrical insulation, and chemical resistance among organic materials.

Thus, the polyimide has been widely used as a core material in automobiles, aerospace fields, and flexible circuit boards, etc. Recently, in accordance with the development of a colorless and transparent polyimide film, the polyimide has also been used for an insulation and protective film of a display requiring optical properties, flexibility resistance, abrasion resistance, dimensional stability, etc.

The polyimide film may be manufactured by preparing a polyamic acid solution, which is a precursor, forming a film at a small thickness using the polyamic acid solution, and then performing heat-treatment.

The polyimide film thus manufactured may be processed with a nip-roll, etc., for improving smoothness, or may be corona-treated for surface modification, and may be wound by a roll and stored.

However, since a general polyimide film has a low average roughness, when the polyimide film is finished as described above, a blocking phenomenon may be caused on a surface of the polyimide film, and there is a limitation in a process that it is not easy to wind the polyimide film.

For this reason, a method of improving an average roughness and minimizing the blocking phenomenon of the polyimide film by adding fillers such as titanium oxide, alumina, silicon nitride, boron nitride, calcium hydrogen phosphate, calcium phosphate, mica, etc., to the polyamic acid solution, which is the precursor of the polyimide film, has been considered.

However, the inorganic fillers described above are not excellent in compatibility with the polyamic acid solution, which is the precursor of the polyimide, and thus have poor dispersibility. In addition, the inorganic fillers are generally atypical in that particle forms are not constant, have a large specific surface area, and have a feature that it is easy for particles of complementary forms to be bonded to each other.

Thus, the inorganic fillers are not easily dispersed in the polyamic acid solution, and may be agglomerated.

The aggregated inorganic fillers may form large and small protrusions on the surface of the polyimide film, thereby reducing smoothness, transmittance, etc., of the polyimide film. In addition, the protrusions may damage a surface of an object to or with which the polyimide film is adhered or is in contact, for example, a display.

The protrusions cause light scattering as well as a decrease in transparency and transmittance in the polyimide film, and may thus act as a fatal disadvantage for the polyimide film for the display in which excellent optical properties are essentially required.

Thus, there is a high need for a novel polyimide film that may solve such a problem at once.

DISCLOSURE

Technical Problem

An object of the present disclosure is to provide a polyimide film having no surface defects such as protrusions, having predetermined average roughness and smoothness, and having excellent transmittance.

In one aspect of the present disclosure, inorganic fillers including a plurality of filler groups having an average particle diameter (D50) each falling within a specific range are disclosed as an essential factor for achieving the above object.

In particular, the plurality of filler groups may satisfy a specific relational expression 1 of the present disclosure. In this specific case, the inorganic fillers may be uniformly dispersed in a base film, and agglomeration of the inorganic fillers may thus be minimized.

As a result, even though the polyimide film of the present disclosure includes fillers, protrusions due to aggregation of the fillers may not be substantially generated.

The polyimide film may also have a predetermined average roughness, smoothness, and excellent transmittance because the inorganic fillers include filler groups of which average particle diameters fall within different ranges, and may be applied to technical fields such as a display on the basis of such a fact.

In another aspect of the present disclosure, the polyimide film may have a predetermined modulus suitable for an electronic device whose shape is variably deformed, such as a display device.

Therefore, a substantial object of the present disclosure is to provide specific embodiments of the present disclosure.

Technical Solution

In one embodiment, the present disclosure provides a polyimide film including: a base film made of polyimide, and inorganic fillers dispersed in the base film,
  wherein the polyimide film has a modulus of 3.5 GPa or less,
  the inorganic fillers include a first filler group having an average particle diameter (D50) falling within the range of 2 µm to 2.7 µm and a second filler group having an average particle diameter (D50) falling within the range of 1 µm to 1.7 µm, and
  each of the first filler group and the second filler group satisfies the following relational expression 1 for particle diameters.

In one embodiment, the present disclosure provides a method of manufacturing a polyimide film.

In one embodiment, the present disclosure provides an electronic device including a polyimide film as at least one of an optical film, an insulating film, and a protective film.

The electronic device may be a display device or a wearable instrument whose shape is variably deformed through at least one selected from bending, curving, and rolling, and the polyimide film may be deformed together in response to the deformation of the electronic device.

Hereinafter, embodiments of the present disclosure will be described in more detail in the order of a "polyimide film" and a "method of manufacturing the polyimide film" according to the present disclosure.

Terms and words used in the present specification and claims are not to be construed as a general or dictionary meaning, but are to be construed as meaning and concepts meeting the technical ideas of the present disclosure based on a principle that the present inventors may appropriately define the concepts of terms in order to describe their inventions in the best mode.

Therefore, the configurations of embodiments described in the present specification are only one of the most preferred embodiments of the present disclosure and do not represent all the technical spirits of the present disclosure. Thus, it should be understood that there may be various equivalents and modification examples that can replace them at the time of filing the present application.

Singular forms as used herein include plural forms unless the context clearly indicates otherwise. It should be understood that the term "comprise," "includes," or "have," etc., as used herein specifies the presence of implemented features, numerals, steps, components, or a combination thereof, but does not preclude the presence or addition of one or more other features, numerals, steps, components, or a combination thereof.

The term "dianhydride" as used herein is intended to include a precursor or derivative thereof, which may not technically be a dianhydride, but nevertheless will react with diamine to form a polyamic acid, and the polyamic acid may be again converted into the polyimide.

The term "diamine" as used herein is intended to include a precursor or derivative thereof, which may not technically be diamine, but nevertheless will react with a dianhydride to form a polyamic acid, and the polyamic acid may be again converted into the polyimide.

It should be understood that when an amount, concentration, or other value or parameter as used herein is given as an enumeration of a range, a preferable range, or preferable upper and lower values, all ranges formed with any upper limit or preferable values of any one pair and any lower limit or preferable values of any one pair are specifically disclosed, regardless of whether the range is disclosed separately. When a range of numerical values is referred to herein, the range is intended to include endpoints thereof and all integers and fractions within that range, unless stated otherwise. It is intended that the scope of the present disclosure is not limited to specific values recited when the range is defined.

Polyimide Film

A polyimide film according to the present disclosure may include a base film made of polyimide, and inorganic fillers dispersed in the base film.

Here, the inorganic fillers may include a first filler group having an average particle diameter (D50) falling within the range of 2 μm to 2.7 μm and a second filler group having an average particle diameter (D50) falling within the range of 1 μm to 1.7 μm. Each of the first filler group and the second filler group may satisfy the following relational expression 1 for particle diameters:

$$0.7 \leq (D90-D10)/(D50) \leq 1.2 \quad (1).$$

Even in the filler group having the same average particle diameter, a particle diameter distribution may be different, and influences on an effect may be different depending on the particle diameter distribution. Such particle diameter distribution may be confirmed by D10, D50, and D90.

D90 is a particle diameter of the smallest particle among 10% of the particles having large particle diameters even in the filler group, D10 is a particle diameter of the largest particle among 10% of particles having small particle diameter in the filler group, and the average particle diameter (D50) is a particle diameter of the largest particle among 50% of particles having small particle diameters in the filler group.

A particle diameter deviation between the particles constituting the filler group may be related to various factors, and a difference between D90 and D10 may also be considered as one of those factors.

In summary, it may be interpreted that the larger the difference between D90 and D10, the larger the particle diameter deviation between the particles constituting the filler group, and it may be interpreted that the smaller the difference between D90 and D10, the smaller the particle diameter deviation between the particles constituting the filler group.

In this regard, when the inorganic fillers of a single filler group are dispersed in the base film, a large particle diameter deviation, that is, out of the range of the above relational expression 1 means "non-uniform distribution of particles" in which there are more "large particles" having a particle diameter of about D90 in any one part of the base film, and there are more "small particles" having a particle diameter of about D10 in the other part of the base film.

The non-uniform distribution of inorganic fillers in the base film makes the polyimide film have a non-uniform surface roughness, and large particles or small particles are biased to any one part of the base film, such that protrusions derived from the inorganic fillers may be formed on a surface of the polyimide film.

Therefore, it can be understood as a factor capable of suppressing protrusion formation that the particle diameter variation of the particles constituting the filler group is small.

Even though the particle diameter deviation is at an appropriate level, if the average particle diameter of the filler group is excessively large, the number of particles settled by gravity in the polyamic acid solution, which is a precursor of the base film, may be increased. Thus, the particles may be biased in one part of the base film, which is another example of the non-uniform distribution of particles described above. In addition, a filler group having an excessive large average particle diameter may contribute to the improvement of the average roughness of the polyimide film, but may reduce the smoothness and transmittance of the film. In another aspect, in the case of a polyimide film for a display requiring high quality, the filler particles themselves having an excessively large particle diameter may also be recognized as defects.

In addition, even though the particle diameter deviation is at an appropriate level, if the average particle diameter of the filler group is excessively small, the filler particles are likely to be aggregated in the polyamic acid solution due to an increase in a specific surface area of the filler group, and accordingly, protrusion formation may be caused. In addition, a filler group having an excessively small average particle diameter may contribute to the improvement of smoothness and transmittance, but may significantly reduce the average roughness, which may act as a cause of generating additional defects such as scratches in a manufacturing process of the film.

That is, it is difficult to solve the above-described problems with either factor of the particle diameter deviation and the average particle diameter of the filler group.

Furthermore, if the average particle diameter is large, the difference between D90 and D10 may be large even thought the particle distribution is uniform, whereas if the average particle diameter is small, the difference between D90 and D10 may be small even thought the particle distribution is non-uniform. Thus, there is a limit to representing the particle diameter distribution only by the difference between D90 and D10.

Thus, the particle diameter distribution may be represented only when a relationship among D10, D50, and D90 is established as in the relational expression 1, and the desired effect of the present disclosure may be achieved only when the filler group satisfiers the range of relational expression 1.

It is assumed that dispersion efficiency of the particles constituting the filler group is increased, so that the particles may be distributed relatively uniformly in the base film, when the filler group satisfies the relational expression 1. In fact, the polyimide film according to the present disclosure may have substantially no protrusions or may include a very small amount of protrusions, and may also have an average roughness, smoothness and transmittance at appropriate levels. This will be clearly demonstrated in 'Best Mode'.

The polyimide film according to the present disclosure is also characterized in that it has average roughness, smoothness, and transmittance at appropriate levels by allowing features that may be exhibited from a first filler group and a second filler group to complementarily act through inorganic fillers including the first filler group and the second filler group whose average particle diameters fall within different ranges.

As described above, any one of the average roughness, the smoothness and the transmittance of the polyimide film may be sacrificed according to the average particle diameter of the filler group, and if a single filler group falling within one average particle diameter range is used, the average roughness, the smoothness and the transmittance will be difficult to be compatible with each other.

However, the polyimide film according to the present disclosure is a new polyimide film in which average roughness, and smoothness and transmittance, which are difficult to be compatible with each other, are compatible at a predetermined level, because an appropriate level of average roughness may be maintained by the first filler group having a relatively large average particle diameter range, and the smoothness and the transmittance may be inherent to an appropriate level by the second filler group having a relatively small average particle diameter range.

In one specific example of the above-mentioned features, the polyimide film has a haze of 12 or less, specifically 10 or less, and an average roughness of 20 nm or more, specifically 20 nm to 50 nm, and more specifically 20 nm to 40 nm. It can be expected that the transmittance of the polyimide film according to the present disclosure is excellent because the haze is inversely proportional to the transmittance Specifically, the polyimide film according to the present disclosure may have a transmittance of 0.4 to 0.6 with respect to a relative value of 1 which is a theoretical maximum transmittance.

In one specific example for implementing the above, the first filler group may have D90 of 3.0 μm to 4.1 μm and D10 of 1.0 μm to 1.6 μm, and the second filler group may have D90 of 1.5 μm to 2.5 μm and D10 of 0.7 μm to 1.2 μm.

If D90 of the first filler group is less than the above range, the specific surface area based on the entire inorganic fillers may be increased, thereby causing agglomeration of the particles, which is not preferable. In addition, If D90 of the first filler group exceeds the above range, the number of particles settled by gravity in the polyamic acid solution may be increased, which is not preferable.

If D10 of the first filler group is less than the above range, the specific surface area based on the entire inorganic fillers may be increased, thereby causing agglomeration of the particles, which is not preferable. In addition, if D10 of the first filler group exceeds the above range, a particle diameter deviation between particles of D10 of the first filter group and large particles of the second filler group, for example, particles of D90 may be large. In this case, the non-uniform distribution of the inorganic fillers may be intensified, which is not preferable.

In addition, in a case of D90 and D10 of the second filler group, disadvantages similar to those of the first filler group described above may occur, and thus, it is preferable to select D90 and D10 in the above ranges.

In one specific example for implementing the above-mentioned features, the polyimide film may include the inorganic fillers of 0.05% to 0.3% by weight, based on the total weight of the polyimide film.

If the content of the inorganic fillers exceeds the above range, the mechanical properties of the polyimide film may be greatly decreased. If the content of the inorganic fillers is less than the above range, the intended effect of the present disclosure may not be exhibited.

In addition, if the contents of the first filler group and the second filler group constituting the inorganic fillers are out of the scope of the present disclosure and are not compatible with each other, for example, if the content of the second filler group is excessively high, and thus the content of the first filler group is decreased, the average roughness may be decreased, but the smoothness and transmittance by the second filler group are not significantly improved.

Conversely, if the content of the first filler group is excessively high, and thus the content of the second filler group is decreased, the effect of improving the smoothness and transmittance by the second filler group may not be exhibited, and non-uniform distribution may be caused.

That is, if the contents of the first filler group and the second filler group are at an appropriate level, the features that may be exhibited in each of these groups are balanced, and the intended effect of the present disclosure may be expressed. However, if the contents of the first filler group and the second filler group are out of the above-described appropriate level, the breakdown of this balance may have a negative impact on the polyimide film.

Thus, the present disclosure discloses the preferable contents of the first filler group and the second filler group.

In one example of the content, the inorganic fillers may include 60% to 80% bye weight, specifically 65% to 75% by weight, and more specifically 68% to 72% by weight of the first filler group, based on the total weight of the inorganic fillers. The inorganic fillers may also include 20% to 40% by weight, specifically 25% to 35% by weight, and more specifically 28% to 32% by weight of the second filler group, based on the total weight of the inorganic fillers.

It should be understood that the desired effect of the present disclosure may be exhibited when the first filler group and the second filler group selected within this content range are used.

Meanwhile, in some cases, for the purpose of improving the smoothness of the polyimide film, the inorganic fillers may further include a third filler group having an average particle diameter (D50) falling within the range of 0.3 μm to 0.6 μm and satisfying the relational expression 1.

However, since the third filler group has a small average particle diameter, such that it is easy for the particles of the third filler group to be aggregated and the average roughness of the polyimide film may be decreased, and it may thus be preferable that the third filler group is included in a limited amount. In one specific example of this, the inorganic fillers may include the third filler group in an amount of 5% by weight or more to less than 20% by weight, specifically 5% to 10% by weight, and more specifically 7% to 10% by weight, based on the total weight of the inorganic fillers.

When the inorganic fillers further includes the third filler group, a part of the second filler group may be included in a form in which a third filler group is replaced. In this case, a weight ratio of the third filler group to the second filler group (the third filler group weight/second filler group weight) may be 0.1 to 1.

The third filler group may have D90 of 0.4 μm to 0.9 μm and D10 of 0.2 μm to 0.4 μm.

If D90 of the third filler group is less than the above range, the specific surface area based on the entire inorganic fillers may be increased, thereby causing agglomeration of particles, which is not preferable. In addition, if D90 of the third filler group exceeds the above range, it is difficult to expect improvement in smoothness. Further, if D10 of the third filler group is less than the above range, the specific surface area based on the entire inorganic fillers may be increased, thereby causing agglomeration of particles. If D10 of the third filler group exceeds the above range, it is difficult to expect an improvement in smoothness.

The inorganic fillers of the present disclosure may be one or more selected from the group consisting of silica, calcium phosphate, calcium carbonate, and barium sulfate having excellent compatibility with the polyamic acid solution, and in detail, may be spherical silica having poor aggregation properties.

In one specific example, the polyimide forming the base film may be derived from imidization of a polyamic acid formed by the polymerization of a dianhydride monomer and a diamine monomer.

The diamine monomer that may be used in the polymerization of the polyamic acid is an aromatic diamine, and may be classified, for example, as follows:

1) A diamine having one benzene ring on its structure and a relatively rigid structure, such as 1,4-diaminobenzene (or paraphenylenediamine, PPD, PDA), 1,3-diaminobenzene, 2,4-diaminotoluene, 2,6-diaminotoluene, 3,5-diaminobenzoic acid (or DABA);

2) A diamine having two benzene rings on its structure, such as diaminodiphenyl ether, for example, 4,4'-diaminodiphenyl ether (or oxydianiline, ODA) and 3,4'-diaminodiphenyl ether, 4,4'-diaminodiphenylmethane (p-methylenedianiline), 3,4'-diaminodiphenylmethane (m-methylenedianiline), 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dichlorobenzidine, 3,3'-dimethylbenzidine (or o-tolidine), 2,2'-dimethylbenzidine (or m-tolidine), 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenylsulfoxide, 3,4'-diaminodiphenylsulfoxide, 4,4'-diaminodiphenylsulfoxide;

3) A diamine having three benzene rings on its structure, such as 1,3-bis(3-aminophenyl)benzene, 1,3-bis(4-aminophenyl)benzene, 1,4-bis(3-aminophenyl)benzene, 1,4-bis(4-amino phenyl)benzene, 1,3-bis(4-aminophenoxy)benzene (or TPE-R), 1,4-bis(3-aminophenoxy)benzene (or TPE-Q), 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-(3-aminophenyl)isopropyl]benzene, 1,4-bis[2-(4-aminophenyl)isopropyl]benzene;

4) A diamine having four benzene rings on its structure, such as 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, bis[3-(3-aminophenoxy)phenyl]ketone, bis[3-(4-aminophenoxy)phenyl]ketone, bis[4-(3-aminophenoxy)phenyl]ketone, bis[4-(4-aminophenoxy)phenyl]ketone, bis[3-(3-aminophenoxy)phenyl]sulfide, bis[3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane (BAPP), 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane.

The above-mentioned diamine may be used alone or in combination of two or more as desired, but the diamine monomer that may be particularly preferably used in the present disclosure may be one or more selected from the group consisting of 4,4'-diaminodiphenyl ether (4,4'-ODA), 3,4'-diaminodiphenyl ether (3,4'-ODA), p-methylenedianiline (p-MDA), or m-methylenedianiline (m-MDA) which is a monomer with characteristics capable of improving transmittance.

The dianhydride monomer that may be used in the polymerization of the polyamic acid may be an aromatic tetracarboxylic dianhydride.

Examples of the aromatic tetracarboxylic dianhydride include pyromellitic dianhydride (or PMDA), 3,3',4,4'-biphenyltetracarboxylic dianhydride (or s-BPDA), 2,3,3',4'- biphenyltetracarboxylic dianhydride (or a-BPDA), oxydiphthalic dianhydride (or ODPA), diphenylsulfone-3,4,3',4'-tetracarboxylic dianhydride (or DSDA), bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride (or BTDA), bis(3,4-dicarboxyphenyl)methane dianhydride, 2,2-bis(3,4-dicarboxyphenyl)propane dianhydride, p-phenylenebis (trimelitic monoester acid anhydride), p-biphenylenebis (trimelitic monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride (BPADA), 2,3,6,7-naphthalenetetracarboxylic acid dianhydride, 1,4,5,8-naphthalenetetracarboxylic dianhydride, 4,4'-(2,2-hexafluoroisopropylidene)diphthalic acid dianhydride, etc. The above-mentioned aromatic tetracarboxylic dianhydride may be used alone or in combination of two or more as desired, but the dianhydride monomer that may be particularly preferably used in the present disclosure may be pyromellitic dianhydride (PMDA).

Meanwhile, the polyimide film according to the present disclosure may satisfy the following relational expression 2:

$$12 \ \mu m \leq T*L \leq 40 \ \mu m \quad (2)$$

wherein, T is a thickness of the polyimide film and is 30 μm to 50 μm, and L is a transmittance of the polyimide film, is a relative value to 1 which is a theoretical maximum transmittance, and is 0.4 to 0.8, and specifically 0.4 to 0.6.

The polyimide film that satisfies these relationships may be suitable, for example, as an insulating or protective film of a display device requiring optical properties based on excellent light transmittance, in detail, a display device whose shape is variably deformed through at least one selected from bending, curving, and rolling.

In one example, a display device of which both end portions are deformed, for example, bent, in the same direction has an inner surface facing the direction in which the display device is deformed and an outer surface, which is a surface opposite to the inner surface. When the display device is deformed, on the inner surface, force is transferred from both end portions of the display device toward a central portion of the display device, and on the outer surface, force is transferred from the central portion of the display device toward both end portions of the display device.

If the polyimide film is added to an outer surface of the display device deformed as described above, a tensile force is formed on the polyimide film by force transferred from a central portion of the display device toward both end portions of the display device. Here, if the modulus of the polyimide film is excessively high, the polyimide film has brittle properties and may not be deformed in a direction in which the polyimide film is tensioned. In this case, the polyimide film may apply stress to the inside of the display to shorten a lifespan of the display.

Conversely, when the polyimide film is added to the inner surface, the polyimide film tends to be compressed by the force transferred from both end portions toward the central portion without forming separate tensile force. Thus, it may be advantageous that the polyimide film added to the inner surface has a high modulus and has thus strong properties against compressive force.

The polyimide film according to the present disclosure has a modulus of 3.5 GPa or less, and may be specialized in being added to the inner surface in a display device that is deformed based on a relatively low modulus. However, it is emphasized that the above mentioned is described as a non-limiting example for the polyimide film according to the present disclosure, and the use of the polyimide film according to the present disclosure is not limited thereto.

Manufacturing Method of Polyimide Film

A method of manufacturing the polyimide film according to the present disclosure may include:
  polymerizing a dianhydride monomer and a diamine monomer in an organic solvent to prepare a polyamic acid solution;
  mixing inorganic fillers with the polyamic acid solution to prepare a precursor composition; and
  forming a film on a support using the precursor composition and performing imidization to form the polyimide film.

A method of polymerizing the polyamic acid includes, for example, the following methods:
  (1) a method of polymerizing the polyamic acid by adding the entire amount of a diamine monomer in an organic solvent, and then adding a dianhydride monomer so that the dianhydride monomer and the diamine monomer become substantially equimolar;
  (2) a method of polymerizing the polyamic acid by adding the entire amount of a dianhydride monomer in an organic solvent, and then adding a diamine monomer so that the diamine minomer and the dianhydride monomer become substantially equimolar;
  (3) a method of polymerizing the polyamic acid by adding some components of a diamine monomer in an organic solvent, mixing some components of a dianhydride monomer to the reaction component in a ratio of about 95 mol % to 105 mol %, adding the remaining diamine monomer component and subsequently adding the remaining dianhydride monomer component so that the diamine monomer and the dianhydride monomer become substantially equimolar;
  (4) a method of polymerizing the polyamic acid by adding a dianhydride monomer in an organic solvent, mixing some components of a diamine compound to the reaction component in a ratio of about 95 mol % to 105 mol %, adding the remaining dianhydride monomer component thereto and subsequently adding the remaining diamine monomer component thereto so that the diamine monomer and the dianhydride monomer become substantially equimolar; and
  (5) a method of polymerizing the polyamic acid by reacting some diamine monomer components and some dianhydride monomer components in an organic solvent such that any one of them is excessive to form a first polymer, reacting some diamine monomer components and some dianhydride monomer components in another organic solvent such that any one of them is excessive to form a second polymer, and mixing the first and second polymers, wherein when the diamine monomer component is excessive when forming the first polymer, the dianhydride monomer component is excessive in the second polymer and when the dianhydride monomer component is excessive in the first polymer, the diamine monomer component is excessive in the second polymer so that the entire diamine monomer component and the dianhydride monomer component used in these reactions become substantially equimolar by mixing the first polymer and the second polymer, and completing the polymerization.

However, the method is an example to aid in the practice of the present disclosure, the scope of the present disclosure is not limited thereto, and any known method may be used.

As the diamine monomer and dianhydride monomer, monomers as described in the previous embodiment may be used.

The organic solvent is not particularly limited as long as it is a solvent in which diamine, dianhydride monomer and polyamic acid may be dissolved, but an example thereof may be an aprotic polar solvent.

Non-limiting examples of the aprotic polar solvent include amide-based solvents such as N,N'-dimethylformamide (DMF) and N,N'-dimethylacetamide (DMAc), phenol-based solvents such as p-chlorophenol, and o-chlorophenol, N-methyl-pyrrolidone (NMP), gamma butyrolactone (GBL), and diglyme, which may be used alone or in combination of two or more.

In some cases, an auxiliary solvent such as toluene, tetrahydrofuran, acetone, methyl ethyl ketone, methanol, ethanol, and water may be used to adjust the solubility of the polyamic acid.

In one example, organic solvents that may be particularly preferably used in the preparation of the polyamic acid solution according to the present disclosure may be N,N'-dimethylformamide and N,N'-dimethylacetamide which are amide-based solvents.

The polyamic acid of the polyamic acid solution thus prepared may have a weight average molecular weight of 150,000 g/mole or more to 1,000,000 g/mole or less, specifically 260,000 g/mole or more to 700,000 g/mole or less, and more specifically 280,000 g/mole or more to 500,000 g/mole or less.

The polyamic acid having such a weight average molecular weight may be preferable for manufacturing a polyimide film having more excellent heat resistance and mechanical properties.

In general, since the weight average molecular weight of the polyamic acid may be proportional to viscosity of the polyamic acid solution containing the polyamic acid and an organic solvent, the weight average molecular weight of the polyamic acid may be controlled within the above range by adjusting the viscosity.

This is because the viscosity of the polyamic acid solution is proportional to the content of a polyamic acid solid, specifically, the total amount of the dianhydride monomer and the diamine monomer used in a polymerization reaction. However, the weight average molecular weight does not represent a one-dimensional linear proportional relationship with the viscosity, but is proportional in the form of a log function.

That is, while the range in which the weight average molecular weight may be increased even if the viscosity is increased in order to obtain a polyamic acid with a higher weight average molecular weight is limited, if the viscosity is excessively high, when the precursor composition is discharged through a die in a film forming process of the polyimide film, a processability problem may be caused due to an increase in pressure inside the die.

Accordingly, the polyamic acid solution according to the present disclosure may contain 15% to 20% by weight of a polyamic acid solid and 80% to 85% by weight of an organic solvent. In this case, the viscosity may be 90,000 cP or more to 350,000 cP or less, specifically 100,000 cP or more to 300,000 cP. Viscosity is measured at room temperature at a shear rate of 1 (1/sec). Within this viscosity range, the weight average molecular weight of the polyamic acid may fall within the above range, and the precursor composition may not cause problems in the film forming process described above.

The step of preparing a precursor composition by mixing inorganic fillers with the polyamic acid solution may include: milling or ultrasonically dispersing a mixture of inorganic fillers and an organic solvent, and mixing the mixture with the polyamic acid solution to prepare a precursor composition; or milling a mixture of inorganic fillers and an organic solvent in a state mixed with the polyamic acid solution to prepare a precursor composition.

For the milling, the use of a bead milling method, without limitation, may be considered. The bead milling is advantageous for dispersion because the mixture may be effectively stirred even when the flow rate of the mixture is low. However, it should be understood that this is only an example to aid in the implementation of the present disclosure.

In the step of forming a film on a support using the precursor composition and performing imidization to form a polyimide film, a thermal imidization method, a chemical imidization method, or a composite imidization method in which the thermal imidization method and the chemical imidization method are used in combination may be used.

This will be described in more detail through the following non-limiting examples.

<Thermal Imidization Method>

The thermal imidization method is a method of inducing an imidization reaction with a heat source such as hot air or an infrared dryer, excluding a chemical catalyst, and may include:

drying the precursor composition to form a gel film; and heat-treating the gel film to obtain a polyimide film;

Here, the gel film may be understood as a film intermediate having self-supporting properties in an intermediate step for conversion from polyamic acid to polyimide.

In the process of forming the gel film, the precursor composition may be cast in a film form on a support such as a glass plate, an aluminum foil, an endless stainless belt, or a stainless drum, and then the precursor composition on the support may be dried at a variable temperature in the range of 50° C. to 200° C., specifically 80° C. to 200° C.

Accordingly, the precursor composition may be partially cured and/or dried to form a gel film. Then, peeling may be performed from the support to obtain a gel film In some cases, a process of stretching the gel film may be performed in order to adjust a thickness and a size of a polyimide film obtained in a subsequent heat treatment process and improve orientation of the polyimide film, and stretching may be performed in at least one of a machine direction (MD) and a transverse direction (TD) with respect to the machine direction.

The gel film thus obtained is fixed to a tenter, heat-treated at a variable temperature in the range of 50° C. to 650° C., specifically 150° C. to 600° C. to remove water, residual solvents, etc., remaining in the gel film, and then almost all remaining amic acid groups are imidized to obtain a polyimide film of the present disclosure.

In some cases, the polyimide film as described above may be further cured by heating and finishing the film at a temperature of 400° C. to 650° C. for 5 seconds to 400 seconds, and the curing may be performed under a predetermined tension in order to alleviate internal stress that may remain in the obtained polyimide film.

<Chemical Imidization Method>

The chemical imidization method is a method of promoting imidization of the amic acid group by adding a dehydrating agent and/or an imidizing agent to the precursor composition.

Here, "dehydrating agent" refers to a substance that promotes a ring closure reaction through a dehydration action on polyamic acid. Non-limiting examples thereof include aliphatic acid anhydride, aromatic acid anhydride, N,N'-dialkylcarbodiimide, halogenated lower aliphatic, halogenated lower fatty acid anhydride, aryl phosphonic dihalide, and thionyl halide, etc. Among these, aliphatic acid anhydride may be desirable in terms of availability and cost. Non-limiting examples thereof include acetic anhydride (AA), propionic acid anhydride, and lactic acid anhydride. etc., and these may be used alone or in combination of two or more.

In addition, an "imidizing agent" refers to a substance having an effect of promoting a ring closure reaction with respect to polyamic acid, and may be, for example, an imine-based component such as an aliphatic tertiary amine, an aromatic tertiary amine, and a heterocyclic tertiary amine. Among these, a heterocyclic tertiary amine may be desirable in terms of reactivity as a catalyst. Non-limiting examples of the heterocyclic tertiary amine include quinoline, isoquinoline, β-picoline (BP), pyridine, etc., and these may be used alone or in combination of two or more.

The amount of the dehydrating agent added is preferably in the range of 0.5 mol to 5 mol, and particularly preferably in the range of 1.0 mol to 4 mol, based on 1 mol of the amic acid group in the polyamic acid. In addition, the amount of the imidizing agent added is preferably in the range of 0.05 mol to 2 mol, and particularly preferably in the range of 0.2 mol to 1 mol, based on 1 mol of the amic acid group in the polyamic acid.

If the dehydrating agent and the imidizing agent are less than the above range, chemical imidization may be insufficient, cracks may be formed in the polyimide film to be manufactured, and a mechanical strength of the film may also be reduced. In addition, if the amount of the dehydrating agent and the imidizing agent added exceeds the above range, imidization may proceed excessively quickly. In this case, it is difficult to be cast in the film form or the manufactured polyimide film may exhibit brittle properties, which is not preferable.

<Complex Imidization Method>

In connection with the above chemical imidization method, a composite imidization method in which a thermal imidization method is additionally performed, may be used for the manufacture of the polyimide film.

Specifically, the composite imidization method may include: a chemical imidization process of adding a dehydrating agent and/or an imidizing agent to the precursor composition at low temperature; and a thermal imidization process of drying the precursor composition to form a gel film and heat-treating the gel film.

During the chemical imidization process, the types and amounts of the dehydrating agent and the imidizing agent added may be appropriately selected as described in the above chemical imidization method.

In the process of forming the gel film, the precursor composition containing the dehydrating agent and the imidizing agent is cast in a film form on a support such as a glass plate, an aluminum foil, an endless stainless belt, or a stainless drum, and then the precursor composition on the support is dried at a variable temperature in the range of 50° C. to 200° C., specifically 80° C. to 200° C. In such a process, the dehydrating agent and/or the imidizing agent may act as a catalyst to rapidly convert an amic acid group into an imide group.

In some cases, a process of stretching the gel film may be performed in order to adjust a thickness and a size of a polyimide film obtained in a subsequent heat treatment process and improve orientation of the polyimide film, and stretching may be performed in at least one of a machine direction (MD) and a transverse direction (TD) with respect to the machine direction.

The volatile content of the gel film may be applied as described in the thermal imidization method as described above.

The gel film thus obtained is fixed to a tenter, heat-treated at a variable temperature in the range of 50° C. to 650° C., specifically 150° C. to 600° C. to remove water, catalysts, residual solvents, etc., remaining in the gel film, and then almost all remaining amic acid groups are imidized, thereby obtaining a polyimide film of the present disclosure. Even in such a heat treatment process, the dehydrating agent and/or the imidizing agent may act as a catalyst to rapidly convert the amic acid group into the imide group, thereby enabling the implementation of a high imidization rate.

In some cases, the polyimide film as described above may be further cured by heating and finishing the film at a temperature of 400° C. to 650° C. for 5 seconds to 400 seconds, and the curing may be performed under a predetermined tension in order to alleviate internal stress that may remain in the obtained polyimide film.

MODES OF THE INVENTION

Figure 1:
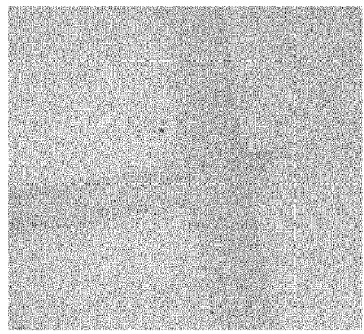
FIG. 1 is a photograph obtained by photographing a surface of a polyimide film according to Example 1.

Hereinafter, the action and effect of the present disclosure will be described in more detail through specific examples of the present disclosure. However, these examples are only presented as examples of the invention, and the scope of the invention is not determined by these examples.

EXAMPLE 1

Preparation Example 1-1 Preparation of a Precursor Composition

To a 1.0 L reactor was added 515.75 g of dimethylformamide (DMF) as an organic solvent under a nitrogen atmosphere. After setting a temperature to 25° C., 44.27 g of ODA was added as a diamine monomer, followed by stirring for about 30 minutes to confirm that the monomer was dissolved. Thereafter, 46.78 g of PMDA were added as a dianhydride monomer, and finally, the final dose was adjusted and added so that the viscosity became 100,000 cP to 150,000 cP to prepare a polyamic acid solution.

Thereafter, a precursor composition was prepared by mixing inorganic fillers including a first filler group and a second filler group having the following characteristics in a polyamic acid solution in an amount of 0.15% based on the content of the polyamic acid solid:

First filler group: Spherical silica having an average particle diameter (D50) of 2 μm, D10 of 1.1 μm, D90 of 3.0 μm, 70% by weight based on the total weight of the inorganic fillers;

Second filler group: Spherical silica having an average particle diameter (D50) of 1 μm, D10 of 0.7 μm, D90 of 1.5 μm, 30% by weight based on the total weight of the inorganic fillers.

Preparation Example 1-2 Manufacture of Polyimide Film

To 100 g of the precursor composition prepared in Preparation Example 1-1 were added 3.0 g of isoquinoline (IQ), 20.8 g of acetic anhydride (AA), and 16.2 g of DMF as a catalyst, the resulting mixture was uniformly mixed and cast on a SUS plate (100SA, Sandvik) at 470 μm using a doctor blade, and dried at a temperature range of 100° C. to 200° C.

Then, the film was peeled off from the SUS plate, fixed to a pin frame, and transferred to a high-temperature tenter.

The film was heated from 200° C. to 600° C. in the high-temperature tenter, cooled at 25° C., and separated from the pin frame to obtain a polyimide film having a width*a length of 1 m*1 m and a thickness of 50 μm.

EXAMPLE 2

A polyimide film was manufactured in the same manner as in Example 1, except for using inorganic fillers including a first filler group and a second filler group having the following characteristics:
First filler group: Spherical silica having an average particle diameter (D50) of 2.7 μm, D10 of 1.5 μm, D90 of 4.1 μm, and 70% by weight based on the total weight of the inorganic fillers;
Second filler group: Spherical silica having an average particle diameter (D50) of 1.7 μm, D10 of 1.2 μm, D90 of 2.5 μm, and 30% by weight based on the total weight of the inorganic fillers.

EXAMPLE 3

A polyimide film was manufactured in the same manner as in Example 1, except for using inorganic fillers including a first filler group and a second filler group having the following characteristics:
First filler group: Spherical silica having an average particle diameter (D50) of 2.2 μm, D10 of 1.3 μm, D90 of 3.3 μm, and 70% by weight based on the total weight of the inorganic fillers;
Second filler group: Spherical silica having an average particle diameter (D50) of 1.3 μm, D10 of 0.9 μm, D90 of 1.9 μm, and 30% by weight based on the total weight of the inorganic fillers.

EXAMPLE 4

A polyimide film was manufactured in the same manner as in Example 1, except for using inorganic fillers including a first filler group and a second filler group having the following characteristics:
First filler group: Spherical silica having an average particle diameter (D50) of 2.2 μm, D10 of 1.3 μm, D90 of 3.3 μm, and 80% by weight based on the total weight of the inorganic fillers;
Second filler group: Spherical silica having an average particle diameter (D50) of 1.3 μm, D10 of 0.9 μm, D90 of 1.9 μm, and 20% by weight based on the total weight of the inorganic fillers.

EXAMPLE 5

A polyimide film was manufactured in the same manner as in Example 1, except for using inorganic fillers including a first filler group, a second filler group, and a third filler group having the following characteristics:
First filler group: Spherical silica having an average particle diameter (D50) of 2 μm, D10 of 1.1 μm, D90 of 3.0 μm, and 70% by weight based on the total weight of the inorganic fillers;
Second filler group: Spherical silica having an average particle diameter (D50) of 1 μm, D10 of 0.7 μm, D90 of 1.5 μm, and 20% by weight based on the total weight of the inorganic fillers;
Third filler group: Spherical silica having an average particle diameter (D50) of 0.3 μm, D10 of 0.2 μm, D90 of 0.42 μm, and 10% by weight based on the total weight of the inorganic fillers.

EXAMPLE 6

A polyimide film was manufactured in the same manner as in Example 1, except for using inorganic fillers including a first filler group, a second filler group, and a third filler group having the following characteristics:
First filler group: Spherical silica having an average particle diameter (D50) of 2.7 μm, D10 of 1.5 μm, D90 of 4.1 μm, and 70% by weight based on the total weight of the inorganic fillers;
Second filler group: Spherical silica having an average particle diameter (D50) of 1.7 μm, D10 of 1.2 μm, D90 of 2.5 μm, and 20% by weight based on the total weight of the inorganic fillers;
Third filler group: Spherical silica having an average particle diameter (D50) of 0.6 μm, D10 of 0.4 μm, D90 of 0.9 μm, and 10% by weight based on the total weight of the inorganic fillers.

COMPARATIVE EXAMPLE 1

A polyimide film was manufactured in the same manner as in Example 1, except for using inorganic fillers including a first filler group and a second filler group having the following characteristics:
First filler group: Calcium phosphate having an average particle diameter (D50) of 2 μm, D10 of 0.7 μm, D90 of 5.3 μm, and 70% by weight based on the total weight of the inorganic fillers;
Second filler group: Barium sulfate having an average particle diameter (D50) of 1 μm, D10 of 0.4 μm, D90 of 2.3 μm, and 30% by weight based on the total weight of the inorganic fillers.

COMPARATIVE EXAMPLE 2

A polyimide film was manufactured in the same manner as in Example 1, except for using inorganic fillers including a single filler group having the following characteristics:
Filler group: Calcium phosphate having an average particle diameter (D50) of 2 μm, D10 of 0.7 μm, D90 of 5.3 μm, and 100% by weight based on the total weight of the inorganic fillers.

COMPARATIVE EXAMPLE 3

A polyimide film was manufactured in the same manner as in Example 1, except for using inorganic fillers including a first filler group and a second filler group having the following characteristics:
  First filler group: Spherical silica having an average particle diameter (D50) of 3 μm, D10 of 1.7 μm, D90 of 4.7 μm, and 70% by weight based on the total weight of the inorganic fillers;
  Second filler group: Spherical silica having an average particle diameter (D50) of 1 μm, D10 of 0.7 μm, D90 of 1.5 μm, and 30% by weight based on the total weight of the inorganic fillers.

COMPARATIVE EXAMPLE 4

A polyimide film was manufactured in the same manner as in Example 1, except for using inorganic fillers including a first filler group and a second filler group having the following characteristics:
  First filler group: Spherical silica having an average particle diameter (D50) of 2 μm, D10 of 1.1 μm, D90 of 3.0 μm, and 70% by weight based on the total weight of the inorganic fillers;
  Second filler group: Spherical silica having an average particle diameter (D50) of 0.6 μm, D10 of 0.4 μm, D90 of 0.9 μm, and 30% by weight based on the total weight of the inorganic fillers.

COMPARATIVE EXAMPLE 5

A polyimide film was manufactured in the same manner as in Example 1, except for using inorganic fillers including a first filler group and a second filler group having the following characteristics:
  First filler group: Spherical silica having an average particle diameter (D50) of 2 μm, D10 of 1.1 μm, D90 of 3.0 μm, and 50% by weight based on the total weight of the inorganic fillers;
  Second filler group: Spherical silica having an average particle diameter (D50) of 1 μm, D10 of 0.7 μm, D90 of 1.5 μm, and 50% by weight based on the total weight of the inorganic fillers.

COMPARATIVE EXAMPLE 6

A polyimide film was manufactured in the same manner as in Example 1, except for using inorganic fillers including a first filler group and a second filler group having the following characteristics:
  First filler group: Spherical silica having an average particle diameter (D50) of 2 μm, D10 of 0.8 μm, D90 of 3.5 μm, and 70% by weight based on the total weight of the inorganic fillers;
  Second filler group: Spherical silica having an average particle diameter (D50) of 1 μm, D10 of 0.3 μm, D90 of 1.8 μm, and 30% by weight based on the total weight of the inorganic fillers.

COMPARATIVE EXAMPLE 7

A polyimide film was manufactured in the same manner as in Example 1, except for using inorganic fillers including a first filler group and a second filler group having the following characteristics:
  First filler group: Spherical silica having an average particle diameter (D50) of 2 μm, D10 of 1.5 μm, D90 of 2.6 μm, and 70% by weight based on the total weight of the inorganic fillers;
  Second filler group: Spherical silica having an average particle diameter (D50) of 1 μm, D10 of 0.7 μm, D90 of 1.3 μm, and 30% by weight based on the total weight of the inorganic fillers.

COMPARATIVE EXAMPLE 8

A polyimide film was manufactured in the same manner as in Example 1, except for using inorganic fillers including a first filler group, a second filler group, and a third filler group having the following characteristics:
  First filler group: Spherical silica having an average particle diameter (D50) of 2 μm, D10 of 1.1 μm, D90 of 3.0 μm, and 70% by weight based on the total weight of the inorganic fillers;
  Second filler group: Spherical silica having an average particle diameter (D50) of 1 μm, D10 of 0.7 μm, D90 of 1.5 μm, and 10% by weight based on the total weight of the inorganic fillers;
  Third filler group: Spherical silica having an average particle diameter (D50) of 0.3 μm, D10 of 0.2 μm, D90 of 0.4 μm, and 20% by weight based on the total weight of the inorganic fillers.

The inorganic fillers used in the above Examples and Comparative Examples are briefly summarized in Table 1 below.

TABLE 1

| | Type of inorganic filler | First filler group | | | | Second filler group | | | | Third filler group | | | |
|---|---|---|---|---|---|---|---|---|---|---|---|---|---|
| | Characteristics | Content | D50 | D10 | D90 | Content | D50 | D10 | D90 | Content | D50 | D10 | D90 |
| Example 1 | Spherical silica | 70 | 2 | 1.1 | 3.0 | 30 | 1 | 0.7 | 1.5 | — | — | — | — |
| Example 2 | Spherical silica | 70 | 2.7 | 1.5 | 4.1 | 30 | 1.7 | 1.2 | 2.5 | — | — | — | — |
| Example 3 | Spherical silica | 70 | 2.2 | 1.3 | 3.3 | 30 | 1.3 | 0.9 | 1.9 | — | — | — | — |
| Example 4 | Spherical silica | 80 | 2.2 | 1.3 | 3.3 | 20 | 1.3 | 0.9 | 1.9 | — | — | — | — |
| Example 5 | Spherical silica | 70 | 2 | 1.1 | 3.0 | 20 | 1 | 0.7 | 1.5 | 10 | 0.3 | 0.2 | 0.42 |

TABLE 1-continued

| Type of inorganic filler | | First filler group | | | | Second filler group | | | | Third filler group | | | |
|---|---|---|---|---|---|---|---|---|---|---|---|---|---|
| | Characteristics | Content | D50 | D10 | D90 | Content | D50 | D10 | D90 | Content | D50 | D10 | D90 |
| Example 6 | Spherical silica | 70 | 2.7 | 1.5 | 4.1 | 20 | 1.7 | 1.2 | 2.5 | 10 | 0.6 | 0.4 | 0.9 |
| Comp. Example 1 | Calcium phosphate/ Barium sulfate | 70 | 2 | 0.7 | 5.3 | 30 | 1 | 0.4 | 2.3 | — | — | — | — |
| Comp. Example 2 | Calcium phosphate | 100 | 2 | 0.7 | 5.3 | — | — | — | — | — | — | — | — |
| Comp. Example 3 | Spherical silica | 70 | 3 | 1.7 | 4.7 | 30 | 1 | 0.7 | 1.5 | — | — | — | — |
| Comp. Example 4 | Spherical silica | 70 | 2 | 1.1 | 3.0 | 30 | 0.6 | 0.4 | 0.9 | — | — | — | — |
| Comp. Example 5 | Spherical silica | 50 | 2 | 1.1 | 3.0 | 50 | 1 | 0.7 | 1.5 | — | — | — | — |
| Comp. Example 6 | Spherical silica | 70 | 2 | 0.8 | 3.5 | 30 | 1 | 0.3 | 1.8 | — | — | — | — |
| Comp. Example 7 | Spherical silica | 70 | 2 | 1.5 | 2.6 | 30 | 1 | 0.7 | 1.3 | — | — | — | — |
| Comp. Example 8 | Spherical silica | 70 | 2 | 1.1 | 3.0 | 10 | 1 | 0.7 | 1.5 | 20 | 0.3 | 0.2 | 0.4 |

Whether or not the fillers used in Examples 1 to 6 and Comparative Examples 1 to 8 satisfy the following relational expression 1 is summarized in Table 2 below:

$$0.7 \le (D90 - D10)/(D50) \le 1.2 \quad (1).$$

TABLE 2

| | First filler group | | Second filler group | | Third filler group | |
|---|---|---|---|---|---|---|
| | Relational expression 1 | Whether or not Relational expression 1 is satisfied | Relational expression 1 | Whether or not Relational expression 1 is satisfied | Relational expression 1 | Whether or not Relational expression 1 is satisfied |
| Example 1 | 0.95 | ○ | 0.80 | ○ | — | — |
| Example 2 | 0.96 | ○ | 0.76 | ○ | — | — |
| Example 3 | 0.91 | ○ | 0.77 | ○ | — | — |
| Example 4 | 0.91 | ○ | 0.77 | ○ | — | — |
| Example 5 | 0.95 | ○ | 0.80 | ○ | 0.73 | ○ |
| Example 6 | 0.96 | ○ | 0.76 | ○ | 0.83 | ○ |
| Comp. Example 1 | 2.30 | X | 1.90 | X | — | — |
| Comp. Example 2 | 2.30 | X | — | — | — | — |
| Comp. Example 3 | 1.00 | ○ | 0.80 | ○ | — | — |
| Comp. Example 4 | 0.95 | ○ | 0.83 | ○ | — | — |
| Comp. Example 5 | 0.95 | ○ | 0.80 | ○ | — | — |
| Comp. Example 6 | 1.35 | X | 1.50 | X | — | — |
| Comp. Example 7 | 0.55 | X | 0.60 | X | — | — |
| Comp. Example 8 | 0.95 | ○ | 0.80 | ○ | 0.67 | X |

Experimental Example 2: Properties Evaluation of Polyimide Film

1) Average roughness evaluation: An average roughness of each polyimide film was measured using a ISO1997 method under the measurement conditions of cut off of 0.25 mm, measurement speed of 0.1 mm/sec, and measurement length of 3 mm per time, and the average value obtained by measuring five times was used. Here, the surface for which the average roughness was measured was an air surface of the polyimide film (the opposite surface of the surface in contact with the plate or the tenter). The above average roughness results are shown in Table 3 below.

2) Surface defect evaluation: The surfaces of the polyimide films manufactured in the Examples and the Comparative Examples were observed with a microscope to check the number of defects having a long diameter of 30 um or more per unit area of 1 m*1 m, and the results are shown in Table 3 and FIG. 1 (Example 1), and FIG. 2 (Comparative Example 6).

3) Haze evaluation: A haze value was measured on the A light source using a HM150 model.

4) Transmittance evaluation: Transmittance was measured by a method presented in ASTM D1003 in the visible light region using a ColorQuesetXE model available from HunterLab, com.

However, the transmittance is a relative value to 1, which is a theoretical maximum transmittance in an arbitrary object, and is shown in Table 3 below.

TABLE 3

| | Average roughness (nm) | (Number of) Surface defects | Haze | Transmittance |
|---|---|---|---|---|
| Example 1 | 26.1 | 2 | 8.1 | 0.55 |
| Example 2 | 39.1 | 3 | 11.9 | 0.43 |
| Example 3 | 30.3 | 0 | 9.4 | 0.51 |
| Example 4 | 30.7 | 0 | 9.0 | 0.50 |
| Example 5 | 21.3 | 1 | 7.5 | 0.59 |
| Example 6 | 34.7 | 6 | 11.0 | 0.45 |
| Comp. Example 1 | 15.3 | 53 | 8.0 | 0.43 |
| Comp. Example 2 | 18.5 | 32 | 7.3 | 0.51 |
| Comp. Example 3 | 45.3 | 25 | 10.5 | 0.47 |
| Comp. Example 4 | 25.8 | 18 | 14.1 | 0.35 |
| Comp. Example 5 | 29.2 | 22 | 14.8 | 0.32 |
| Comp. Example 6 | 42.4 | 31 | 8.4 | 0.47 |
| Comp. Example 7 | 29.7 | 13 | 13.8 | 0.35 |
| Comp. Example 8 | 28.1 | 29 | 13.3 | 0.38 |

From the results in Table 3, the polyimide films of all Examples in which the relational expression 1 is satisfied, D50, D90, and D10 fall within the range of the present disclosure, and the content of each filler group is also within the scope of the present disclosure, showed an average roughness of 20 nm or more, a haze of 12 or less, a transmittance of 0.4 or more, and an excellent smoothness.

In addition, it can be seen that the polyimide film of Examples had no surface defects (protrusions). For surface defects, it can be confirmed that the polyimide film has a smooth surface with reference to FIG. 1 obtained by photographing the surface of the polyimide film according to Example 1.

Meanwhile, it can be seen that in the Comparative Examples where at least one of various factors according to the present disclosure, specifically, a filler group type, a content, a particle diameter, and relational expression 1 is unsatisfactory, at least one of average roughness, haze, transmittance, and smoothness is poor. It should be noted that from the results of these Comparative Examples, the average roughness, transmittance, and smoothness, which are difficult to be compatible with each other, may be compatible at an appropriate level when the experiment is carried out according to the present disclosure.

Figure 2:
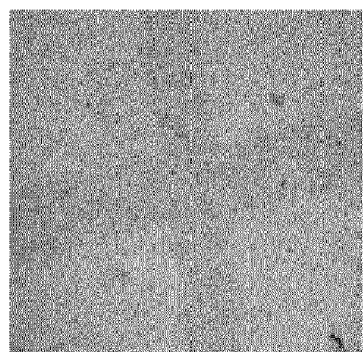
FIG. 2 is a photograph obtained by photographing a surface of a polyimide film according to Comparative Example 6.

In addition, as described above, the Comparative Examples deviating from the present disclosure include a plurality of surface defects, for example, as shown in FIG. 2, and thus include the conventional problem as it is.

Experimental Example 3: Modulus Evaluation of Polyimide Film

The moduli of the polyimide films of Examples were measured by a method suggested in ASTM D882 using an Instron 5564 model, and measurement results are shown in Table 4.

TABLE 4

| | Modulus (GPa) |
|---|---|
| Example 1 | 3.0 |
| Example 2 | 2.7 |
| Example 3 | 2.8 |
| Example 4 | 3.3 |
| Example 5 | 3.4 |
| Example 6 | 2.6 |

It can be seen from the results of Table 4 that the polyimide film according to the present disclosure has a modulus of 3.5 GPa or less.

Although the above description has been made with reference to the embodiments of the present disclosure, a person of ordinary skill in the field to which the present disclosure pertains will be able to make various applications and modifications within the scope of the present disclosure based on the above mentioned.

INDUSTRIAL APPLICABILITY

The present disclosure described in detail above the advantages of a polyimide film including inorganic fillers, specifically, a polyimide film that satisfies the specific relational expression 1 of the present disclosure and includes inorganic fillers consisting of a plurality of filler groups having different particle diameters.

In summary, the polyimide film of the present disclosure has substantially no protrusions due to filler aggregation, and may have an average roughness, smoothness, and transmittance at an appropriate level, which are difficult to be compatible with each other by filler groups having different average particle diameters.

The invention claimed is:

1. A polyimide film, comprising a base film made of polyimide, and inorganic fillers dispersed in the base film, wherein the polyimide film has a modulus of 3.5 GPa or less,
the inorganic fillers include a first filler group having an average particle diameter (D50) falling within the range of 2 µm to 2.7 µm and a second filler group having an average particle diameter (D50) falling within the range of 1 µm to 1.7 µm,
the first filler group is included in an amount of 60% to 80% by weight and the second filler group is included in an amount of 20% to 40% by weight, based on the total weight of the inorganic fillers, and
wherein the inorganic fillers are one or more selected from the group consisting of silica, calcium phosphate, calcium carbonate, and barium sulfate, and
each of the first filler group and the second filler group satisfies the following relational expression 1 for particle diameters:

$$0.7 \leq (D90-D10)/(D50) \leq 1.2 \tag{1}$$

2. The polyimide film of claim 1, wherein the inorganic fillers further include a third filler group having an average particle diameter (D50) falling within the range of 0.3 µm to 0.6 µm and satisfying the relational expression 1.

3. The polyimide film of claim 2, wherein the third filler group is included in an amount of 5% by weight or more to less than 20% by weight, based on the total weight of the inorganic fillers.

4. The polyimide film of claim 2, wherein the third filler group has D90 of 0.4 µm to 0.9 µm and D10 of 0.2 µm to 0.4 µm.

5. The polyimide film of claim 1, wherein the inorganic fillers are spherical silica.

6. The polyimide film of claim 1, wherein the inorganic fillers are included in an amount of 0.05% to 0.3% by weight, based on the total weight of the polyimide film.

7. The polyimide film of claim 1, wherein the first filler group has D90 of 3.0 μm to 4.1 μm and D10 of 1.0 μm to 1.6 μm, and the second filler group has D90 of 1.5 μm to 2.5 μm and D10 of 0.7 μm to 1.2 μm.

8. The polyimide film of claim 1, wherein a haze of the polyimide film is 12 or less and an average roughness of the polyimide film is 20 nm or more.

9. The polyimide film of claim 1, wherein the polyimide film satisfies the following relational expression 2:

$$12 \ \mu m \leq T*L \leq 40 \ \mu m \quad (2)$$

wherein T is a thickness of the polyimide film and is 30 μm to 50 μm, and L is a transmittance of the polyimide film, is a relative value to 1 which is a theoretical maximum transmittance, and is 0.4 to 0.6.

10. The polyimide film of claim 1, wherein the polyimide forming the base film is derived from imidization of a polyamic acid formed by polymerization of a dianhydride monomer and a diamine monomer.

11. The polyimide film of claim 10, wherein the dianhydride monomer is pyromellitic dianhydride (PMDA), and the diamine monomer is one or more selected from the group consisting of 4,4'-diaminodiphenyl ether (4,4'-ODA), 3,4'-diaminodiphenyl ether (3,4'-ODA), p-methylenedianiline (p-MDA) and m-methylenedianiline (m-MDA).

12. An electronic device comprising the polyimide film of claim 1 as at least one of an optical film, an insulating film, and a protective film.

13. The electronic device of claim 12, wherein the electronic device is a display device or a wearable instrument whose shape is variably deformed through at least one selected from bending, curving, and rolling, and the polyimide film is deformed together in response to the deformation of the electronic device.

14. A method of manufacturing the polyimide film of claim 1, the method comprising:
polymerizing a dianhydride monomer and a diamine monomer in an organic solvent to prepare a polyamic acid solution;
mixing inorganic fillers with the polyamic acid solution to prepare a precursor composition; and
forming a film on a support using the precursor composition and performing imidization to form the polyimide film.

* * * * *